US011811792B1

(12) United States Patent
Silva et al.

(10) Patent No.: US 11,811,792 B1
(45) Date of Patent: Nov. 7, 2023

(54) SYSTEMS AND METHODS FOR PREVENTING SOCIAL ENGINEERING ATTACKS USING DISTRIBUTED FACT CHECKING

(71) Applicant: GEN DIGITAL INC., Tempe, AZ (US)

(72) Inventors: David Silva, Dublin (IE); Johann Roturier, Kildare (IE); Yun Shen, Bristol (GB); Pratyush Banerjee, Dublin (IE)

(73) Assignee: GEN DIGITAL INC., Tempe, AZ (US)

( * ) Notice: Subject to any disclaimer, the term of this patent is extended or adjusted under 35 U.S.C. 154(b) by 319 days.

(21) Appl. No.: 16/870,183

(22) Filed: May 8, 2020

(51) Int. Cl.
*G06F 21/00* (2013.01)
*H04L 9/40* (2022.01)
*G06F 21/62* (2013.01)
*G06F 40/279* (2020.01)
*G06F 16/9536* (2019.01)

(52) U.S. Cl.
CPC ...... *H04L 63/1416* (2013.01); *G06F 16/9536* (2019.01); *G06F 21/6245* (2013.01); *G06F 40/279* (2020.01); *H04L 63/1425* (2013.01)

(58) Field of Classification Search
CPC ............. H04L 63/1416; H04L 63/1425; G06F 16/9536; G06F 21/6245; G06F 40/279
See application file for complete search history.

(56) References Cited

U.S. PATENT DOCUMENTS

| | | | |
|---|---|---|---|
| 9,110,952 B2* | 8/2015 | Glasgow | G06F 16/2457 |
| 2011/0153539 A1* | 6/2011 | Rojahn | G06F 16/367 |
| | | | 706/50 |
| 2013/0198196 A1* | 8/2013 | Myslinski | G06Q 30/02 |
| | | | 707/758 |
| 2015/0188898 A1* | 7/2015 | Chow | G06F 21/31 |
| | | | 726/7 |

(Continued)

FOREIGN PATENT DOCUMENTS

| | | | | |
|---|---|---|---|---|
| KR | 102090237 B1 * | 7/2018 | ......... | G06F 16/3344 |
| WO | WO-2019043379 A1 * | 3/2019 | ........... | G06F 40/205 |

OTHER PUBLICATIONS

Thorne et al., "FEVER: a large-scale dataset for Fact Extraction and VERification", Dec. 18, 2018, 20 pages.

(Continued)

*Primary Examiner* — Michael M Lee
(74) *Attorney, Agent, or Firm* — Greenberg Traurig, LLP (57) ABSTRACT

The disclosed computer-implemented method for preventing social engineering attacks using distributed fact checking may include (i) capturing one or more words or tones received by a party to a communication, (ii) extracting speech features associated with the words or tones to identify one or more alleged facts in the communication, (iii) generating one or more queries to verify the alleged facts in the communication, (iv) determining, utilizing distributed fact checking, whether the alleged facts are true based on the queries, and (v) performing a security action that generates an alert to protect against a potential social engineering (Continued)

attack on the receiving party when at least one of the alleged facts are determined to be false. Various other methods, systems, and computer-readable media are also disclosed.

20 Claims, 7 Drawing Sheets

(56) References Cited

U.S. PATENT DOCUMENTS

| | | | |
|---|---|---|---|
| 2015/0248482 A1* | 9/2015 | Myslinski | G06F 16/248 |
| | | | 707/706 |
| 2015/0254247 A1* | 9/2015 | Bostick | G06F 16/3344 |
| | | | 707/723 |
| 2015/0339356 A1* | 11/2015 | Myslinski | G06F 16/951 |
| | | | 707/728 |
| 2016/0217793 A1* | 7/2016 | Gorodetski | G10L 17/04 |
| 2017/0019529 A1* | 1/2017 | Bostick | G06Q 50/265 |
| 2017/0019533 A1* | 1/2017 | Bostick | H04L 51/32 |
| 2018/0089305 A1* | 3/2018 | Croutwater | G06F 16/3334 |
| 2018/0097838 A1* | 4/2018 | Stolarz | G06N 3/084 |
| 2020/0137110 A1* | 4/2020 | Tyler | H04L 63/1483 |
| 2020/0160194 A1* | 5/2020 | Stoilos | G06N 20/00 |
| 2020/0272696 A1* | 8/2020 | Muraoka | G06F 40/30 |
| 2020/0313890 A1* | 10/2020 | Mondello | H04W 4/023 |
| 2021/0200954 A1* | 7/2021 | Dsouza | G06N 20/00 |

OTHER PUBLICATIONS

Reddy et al., "DeFactoNLP: Fact Verification using Entity Recognition, TFIDF Vector Comparison and Decomposable Attention", Nov. 1, 2018, pp. 132-137.

Alonso-Reina et al., "Team GPLSI. Approach for automated fact checking", Nov. 3, 2019, pp. 1-5.

Thorne et al., "FEVER 2.0 Workshop", URL: https://fever.ai/2019/workshop.html, as accessed on May 11, 2020, 5 pages.

* cited by examiner

SYSTEMS AND METHODS FOR PREVENTING SOCIAL ENGINEERING ATTACKS USING DISTRIBUTED FACT CHECKING

BACKGROUND

Cloud-based family control security services are often utilized by computing devices for monitoring the online activities of children or other potentially vulnerable members of a given population (e.g., seniors, sick, and/or infirm individuals) by a parent, designated guardian, or other responsible party to prevent certain cyberattacks intended to access confidential information without authorization and potentially with malicious intent. For example, a parent may utilize a family control security monitoring service to monitor a child's mobile computing device for received e-mails, accessed websites, online chat room sessions, and/or the use of mobile applications (e.g., social media platforms) to identify potential social engineering attacks (e.g., online scams, phishing exploits, etc.) intended to obtain personally identifiable information (PII) for malicious purposes. Upon identifying the potential attacks, these services may subsequently enable the implementation of various remedial actions (e.g., require approval prior to utilizing certain mobile application features, blocking specific online activities, etc.) to prevent reoccurrence.

Traditional family control security services, however, while often effective in addressing potential social engineering attacks originating in the online or digital space, are ineffective in addressing these attacks when they originate in the physical world which may include a number of common social interactions where a vulnerable party is unsupervised by a parent or guardian. For example, many social engineering attacks may often originate with a telephone call from a malicious party to a mobile device for establishing a trust relationship with a potentially vulnerable party (e.g., the malicious party may allege to be associated with a known company or governmental entity having an online presence or listed in a mobile device contact list) and once the trust relationship is established, obtain PII (e.g., account login information) for conducting a cyberattack. In addition, some social engineering attacks may not originate on a computing device at all but rather as a result of a verbal conversation initiated by a malicious party in a physical environment for the purposes of obtaining PII (e.g., via verbal persuasion, verbal or physical harassment, etc.).

SUMMARY

As will be described in greater detail below, the present disclosure describes various systems and methods for preventing social engineering attacks using distributed fact checking.

In one example, a computer-implemented method for preventing social engineering attacks using distributed fact checking may include (i) capturing one or more words or tones received by a party to a communication, (ii) extracting speech features associated with the words or tones to identify one or more alleged facts in the communication, (iii) generating one or more queries to verify the alleged facts in the communication, (iv) determining, utilizing distributed fact checking, whether the alleged facts are true based on the queries, and (v) performing a security action that generates an alert to protect against a potential social engineering attack on the receiving party when at least one of the alleged facts are determined to be false.

In some embodiments, the computer-implemented method may further include performing a security action that generates an alert notifying the receiving party that the alleged facts are true. In some examples, the words or tones received by the party to the communication may be captured by (i) detecting, in real-time, a starting word or tone spoken at an initiation of the communication, (ii) recording, in response to the detected starting word or tone, the communication including each of the words or tones received by the party, and (iii) transcribing the communication including each of the words received by the party.

In some embodiments, the speech features associated with the words or tones in the communication may be extracted by (i) utilizing natural language processing to recognize text fragments representing one or more statements made in a transcription of the communication and (ii) extracting the text fragments from the transcription. In some examples, a text fragment may be a semantic triple representing text corresponding to a subject, an object, and an action from a statement or a claim made to the receiving party in the communication. In some examples, the natural language processing may include textual entailment recognition.

In some embodiments, determining whether the alleged facts are true may include (i) determining a verification method for performing the distributed fact checking based on the queries and (ii) performing, based on the determined verification method, the distributed fact checking to verify whether one or more claims made in the alleged facts are true. In some examples, the verification method may be determined by selecting (i) a trusted recipient associated with the receiving party for verifying the claims made in the alleged facts, (ii) a targeted trusted online source for verifying the claims made in the alleged facts, or (iii) a generic trusted online source for verifying the claims made in the alleged facts.

In some embodiments, the alert to protect against the potential social engineering attack on the receiving party may include (i) a warning alert directed to the receiving party when the alleged facts are determined to be false and (ii) a copy of the warning alert directed to a third party having a relationship with the receiving party when the alleged facts are determined to be false. In some examples, the alert may be a trust alert directed to the receiving party when the alleged facts are determined to be true. In some examples, the alert may be a haptic feedback alert.

In one embodiment, a system for preventing social engineering attacks using distributed fact checking may include at least one physical processor and physical memory that includes a set of modules and computer-executable instructions that, when executed by the physical processor, cause the physical processor to (i) capture, by a capture module, one or more words or tones received by a party to a communication, (ii) extract, by an extraction module, speech features associated with the words or tones to identify one or more alleged facts in the communication, (iii) generate, by a query module, one or more queries to verify the alleged facts in the communication, (iv) determine, by a determining module and utilizing distributed fact checking, whether the alleged facts are true based on the queries, and (v) perform, by a security module, a security action that generates an alert to protect against a potential social engineering attack on the receiving party when at least one of the alleged facts are determined to be false.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) capture one or more words or tones received by a party to a communication, (ii) extract speech features associated with the words or tones to identify one or more alleged facts in the communication, (iii) generate one or more queries to verify the alleged facts in the communication, (iv) determine, utilizing distributed fact checking, whether the alleged facts are true based on the queries, and (v) perform a security action that generates an alert to protect against a potential social engineering attack on the receiving party when at least one of the alleged facts are determined to be false.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for preventing social engineering attacks using distributed fact checking.

As will be described in greater detail below, the systems and methods described herein may utilize the output of a conversation recorded by a physical device (e.g., a mobile device with audio/video recording capabilities (e.g., a smartphone, smartwatch or other wearable computing device) in a physical environment to extract alleged facts from a speaker's transcribed speech and perform distributed fact checking against either online data sources or other knowledge sources (e.g., a designated guardian) for validation of any claims made during the conversation based on the alleged facts. By performing distributed fact checking in this way, discreet security intervention actions may be taken by a computing device according to a predefined notification policy (e.g., generating haptic feedback alerts, sending an electronic notification to a guardian, etc.) upon the validation of claims made by a party to the conversation for potentially conducting a social engineering attack against the other party, thereby enabling potential victims (and/or their designated guardians) to become aware of potential social engineering attacks in real-time without alerting the alleged attacker in a physical environment and further providing several advantages over traditional cloud-based security services that are only effective against addressing social engineering cyberattacks originating in a digital (e.g., online) environment. In addition, the systems and methods described herein may improve the field of computing device security by increasing the effectiveness of parental (or family) control software in preventing cyberattacks against computing devices utilizing information obtained outside of a digital or online environment.

Figure 1:
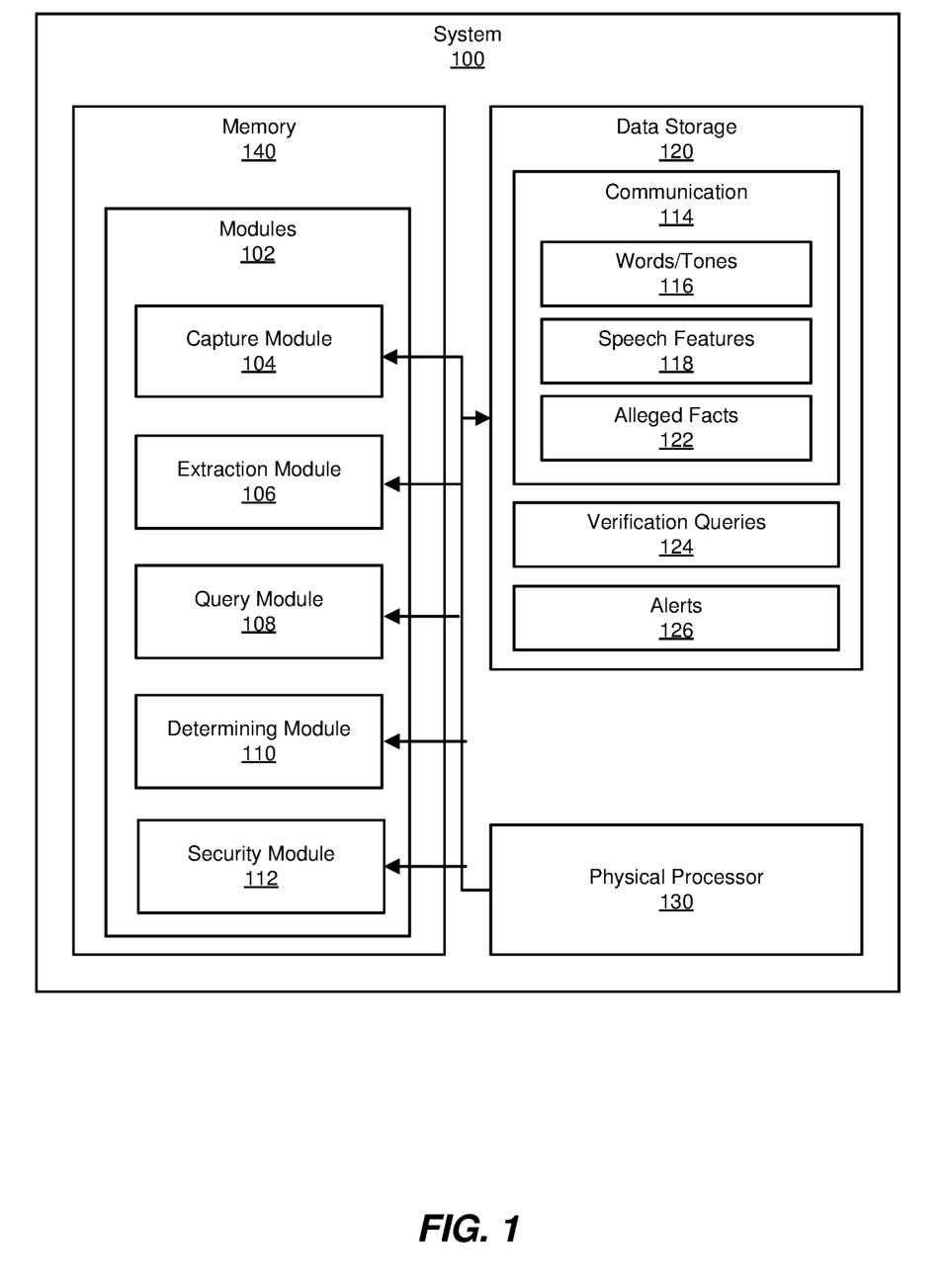
FIG. 1 is a block diagram of an example system for preventing social engineering attacks using distributed fact checking.
Figure 2:
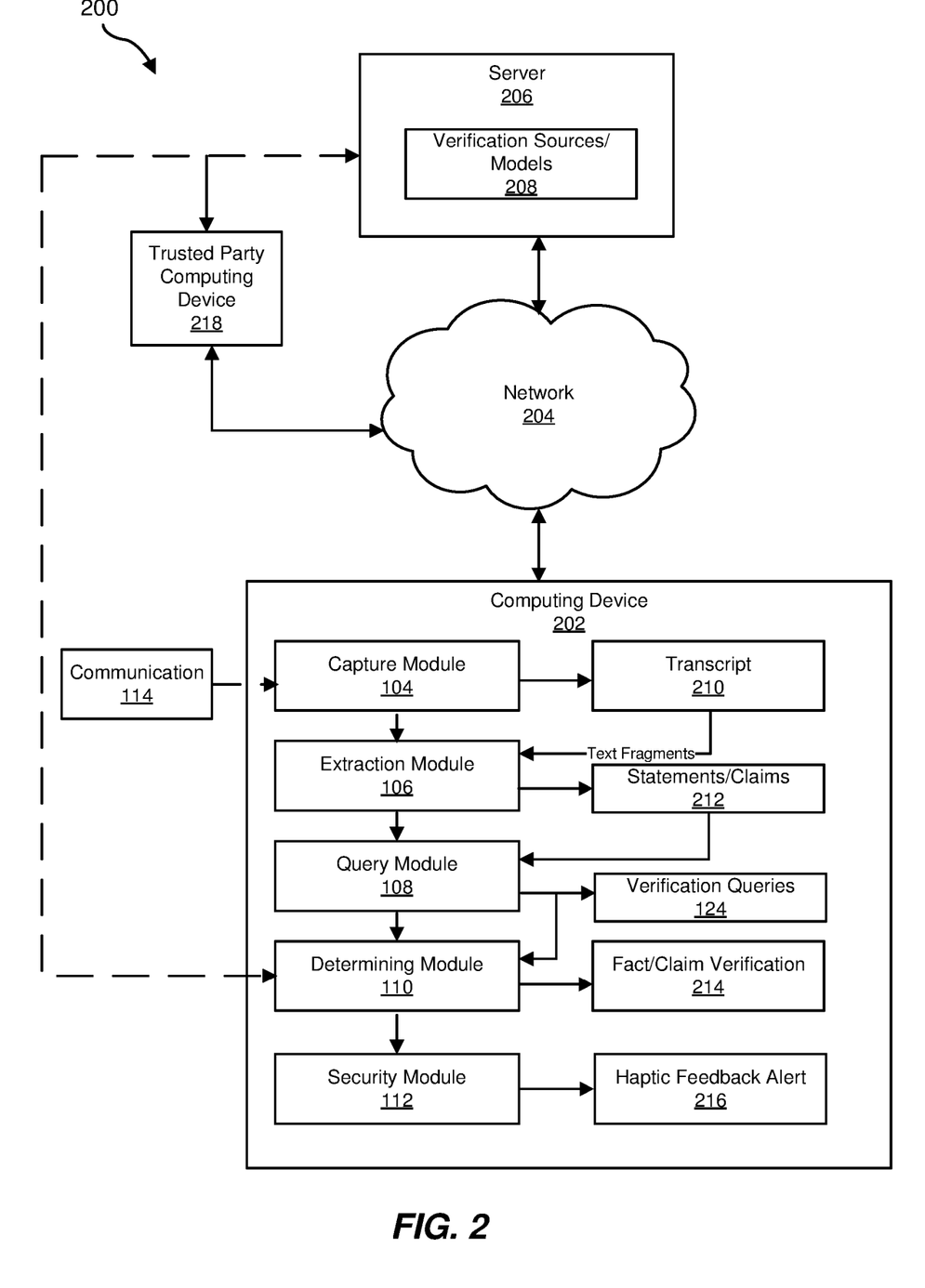
FIG. 2 is a block diagram of an additional example system for preventing social engineering attacks using distributed fact checking.
Figure 3:
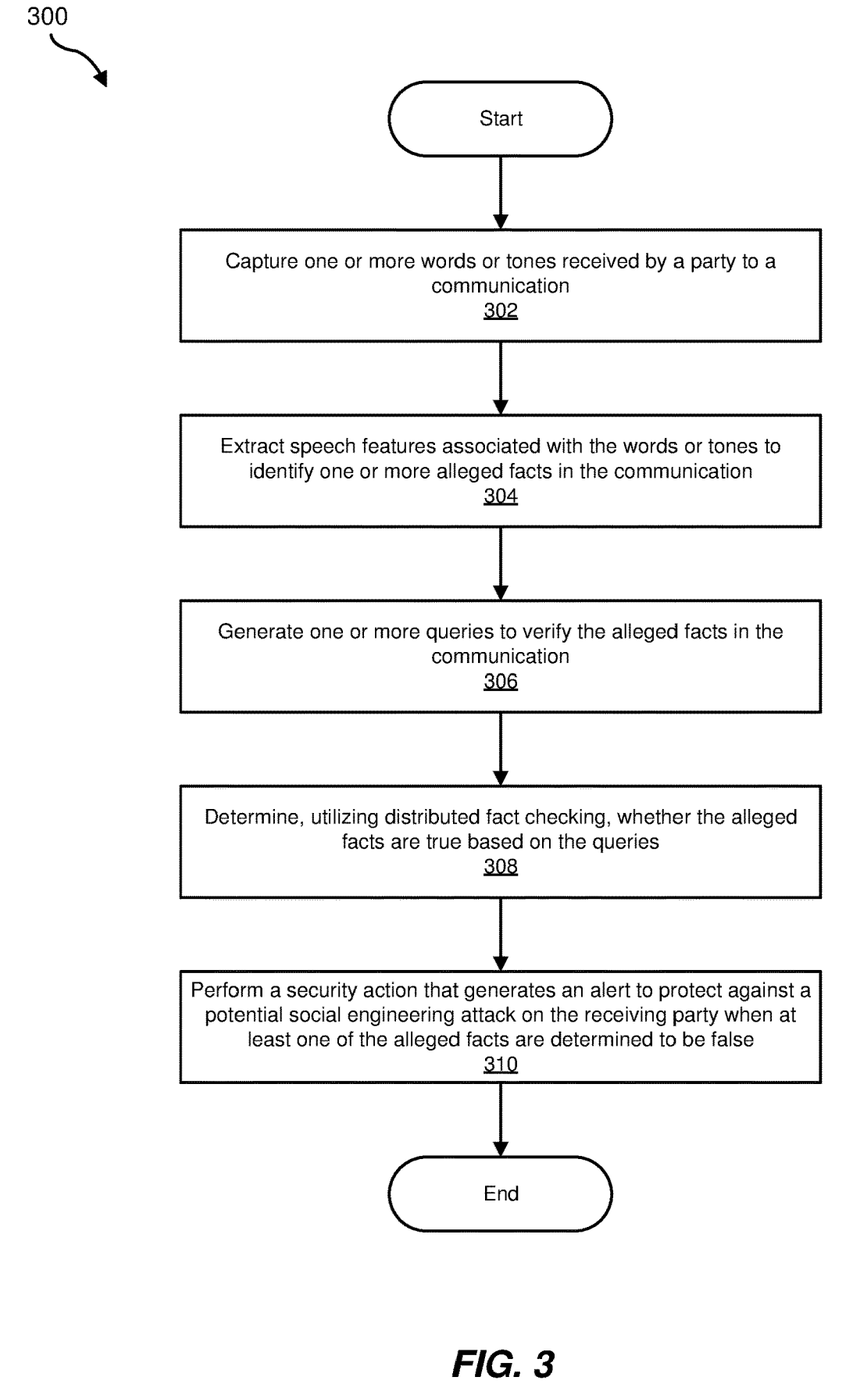
FIG. 3 is a flow diagram of an example method for preventing social engineering attacks using distributed fact checking.
Figure 4:
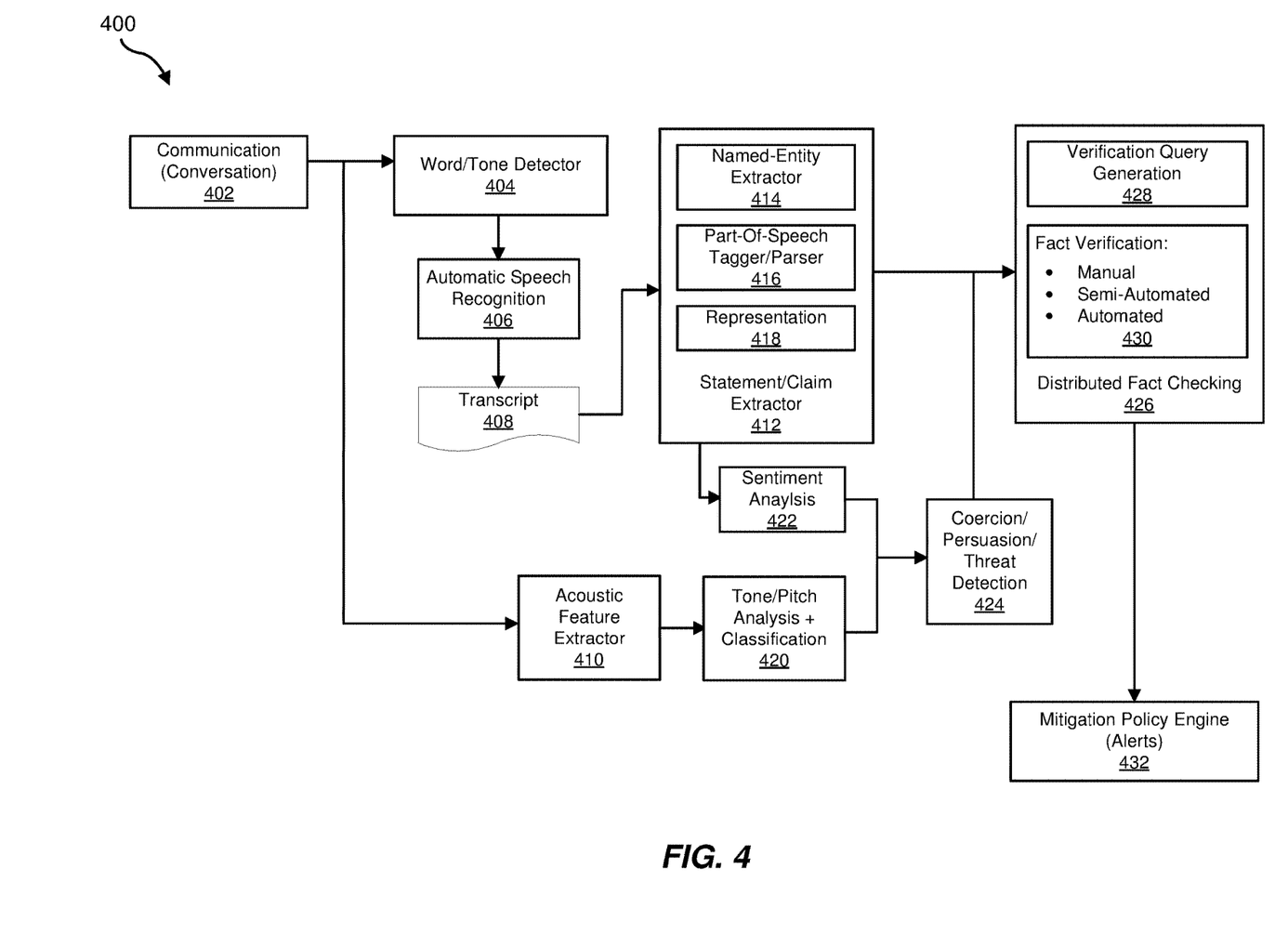
FIG. 4 is a block diagram of another additional example system for preventing social engineering attacks using distributed fact checking.

The following will provide, with reference to FIGS. 1-2 and 4, detailed descriptions of example systems for preventing social engineering attacks using distributed fact checking. Detailed descriptions of corresponding computer-implemented methods will also be provided in connection with FIGS. 3 and 5. In addition, detailed descriptions of an example computing system and network architecture capable of implementing one or more of the embodiments described herein will be provided in connection with FIGS. 6 and 7, respectively.

FIG. 1 is a block diagram of an example system 100 for preventing social engineering attacks using distributed fact checking. As illustrated in this figure, example system 100 may include one or more modules 102 for performing one or more tasks. For example, and as will be explained in greater detail below, example system 100 may include a capture module 104 that captures words/tones 116 received by a party to a communication 114. Example system 100 may additionally include an extraction module 106 that extracts speech features 118 associated with words/tones 116 to identify one or more alleged facts 122 in communication 114. Example system 100 may also include a query module 108 that generates verification queries 124 to verify alleged facts 122 in communication 114. Example system 100 may additionally include a determining module 110 that determines, utilizing distributed fact checking, whether alleged facts 122 are true based on verification queries 124. Example system 100 may also include a security module 112 that performs a security action that generates one or more alerts 126 to protect against a potential social engineering attack on the receiving party when any of alleged facts 122 are determined to be false. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate preventing social engineering attacks using distributed fact checking. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In one example, data storage 120 may store communication 114, words/tones 116, speech features 118, and alleged facts 122. In some embodiments, communication 114 may be stored as a speech-to-text transcription. Data storage 120 may also store verification queries 124 and alerts 126.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 and a trusted party computing device 218 via a network 204. In one example, all or a portion of the functionality of modules 102 may be performed by computing device 202, and/or any other suitable computing system. As will be described in greater detail below, one or more of modules 102 from FIG. 1 may, when executed by at least one processor of computing device 202, enable computing device 202 to prevent social engineering attacks using distributed fact checking.

For example, capture module 104 may receive communication 114 and generate a transcript 210 thereof. Next, extraction module 106 may extract, from transcript 210, text fragments representing statements/claims 212 (e.g., alleged facts in communication 114). Then, query module 108 may generate verification queries 124 to verify statements/claims 212. Next, determining module 110 may utilize distributed fact checking (e.g., via verification sources/models 208 on server 206 or via a trusted party associated with trusted party computing device 218) to determine fact/claim verification 214 representing whether any of statements/claims 212 are true based on verification queries 124. Finally, security module 112 may perform a security action that generates an alert (such as a haptic feedback alert 216) to protect against a potential social engineering attack on the receiving party to communication 114 when one or more of statements/claims 212 are determined to be false.

Computing device 202 generally represents any type or form of computing device capable of reading computer-executable instructions. In some examples, computing device 202 may be a mobile computing device having audio/video recording capabilities including, without limitation, a smartphone, smartwatch, smart glasses, or other wearable computing device and further running client-side family control security software. Additional examples of computing device 202 include, without limitation, laptops, tablets, desktops, servers, cellular phones, Personal Digital Assistants (PDAs), multimedia players, embedded systems, smart vehicles, smart packaging (e.g., active or intelligent packaging), gaming consoles, so-called Internet-of-Things devices (e.g., smart appliances, etc.), variations or combinations of one or more of the same, and/or any other suitable computing device. Trusted party computing device 218 may generally represent generally represent any type or form of computing device capable of reading computer-executable instructions including running client-side family control security software.

Server 206 generally represents any type or form of computing device that is capable of reading and/or executing computer-readable instructions. In some examples, server 206 may be a database or application server providing data verification services and executing one or more claim verification models for verifying data queries. Additional examples of server 206 include, without limitation, security servers, web servers, and/or storage servers configured to run certain software applications and/or provide various security, web, and/or storage services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202, server 206, and trusted party computing device 218. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

FIG. 3 is a flow diagram of an example computer-implemented method 300 for preventing social engineering attacks using distributed fact checking. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple substeps, examples of which will be provided in greater detail below.

As illustrated in FIG. 3, at step 302 one or more of the systems described herein may capture one or more words or tones received by a party to a communication. For example, capture module 104 may, as part of computing device 202 in FIG. 2, capture words/tones 116 received by a party to communication 114. In some examples, communication 114 may be a conversation between two parties that is initiated (e.g., via a telephone call or a text message) by an alleged representative of a service provider in connection with offering a service to a receiving party who, in some embodiments, may be a child, elderly person, or other potentially vulnerable party.

Capture module 104 may capture words/tones 116 in a variety of ways. In some embodiments, capture module 104 may detect, utilizing a on computing device 202 and in real-time, a starting word or tone spoken at the initiation of communication 114, record communication 114 including words/tones 116, and then transcribe communication 114 including any captured words. For example, communication 114 may represent an unsolicited telephone or in-person conversation initiated by an alleged representative of an organization to a receiving party (e.g., a child, elderly person, or other potentially vulnerable party) and include the statement "Hi, I'm David from ACME, Inc. and due to recent climate change legislation, you are required to upgrade your home insulation by 2021 and we have a great offer for you." Thus, in this example, upon detecting the word "Hi," capture module 104 may initiate the recording of the conversation for capturing all of the following words in the statement made to the receiving party and then transcribe the statement in transcript 210. As another example, communication 114 may represent a conversation initiated by an alleged representative of a product manufacturer and include the statement "Hi, I'm David from National Telecom and I would like to offer you a great deal on our latest product." In this example, during the conversation, emphasis (e.g., a high tone as compared to a predetermined baseline) may have been placed on the words "Hi" and "great" as a form of persuasion to the receiving party. Thus, upon detecting the tone used in the word "Hi," capture module 104 may initiate an audio or video recording of the conversation for capturing all of the following words in the statement made to the receiving party (and further flag the word "great" based on the detected tone) and then transcribe the statement in transcript 210.

At step 304 one or more of the systems described herein may extract speech features associated with the words or tones to identify one or more alleged facts in the communication. For example, extraction module 106 may, as part of computing device 202 in FIG. 2, extract speech features 118 associated with words/tones 116 to identify alleged facts 122 in communication 114.

The term "speech features," as used herein, generally refers to any text or word fragments representing knowledge (e.g., a statement or alleged statement of fact) in a machine-readable way. For example, speech features may include a semantic triple (or triple) which is a set of three data entities that codifies a statement in the form of subject-predicate-object expressions. Thus, in the expression "David from ACME, Inc.," the data entity "David" represents the subject, the data entity "from" represents the predicate (or action) and the data entity "ACME, Inc." represents the object.

The term "alleged facts," as used herein, generally refers to any statements made in a communication representing a verifiable statement or claim (which may or may not be true). For example, a statement made by a person alleging to be a representative of a national telecommunications company for the purpose of selling a product or service may be verified as true or false through a variety of online data sources (e.g., a company website, a public database of business organizations, social media platforms, etc.). In addition, statements may also be verified using various human sources (e.g., the parent or guardian of a child or elderly person).

Extraction module 106 may extract speech features 118 in a variety of ways. In some embodiments, extraction module 106 may utilize natural language processing to recognize text fragments representing statements/claims 212 from transcript 210 and then extract the text fragments from the transcription. In one example, the text fragments extracted by extraction module 106 may include a semantic triple representing text corresponding to a subject, object, and an action (or predicate) from statements/claims 212 made in communication 114. For example, in the statement "I'm David from National Telecom and I would like to offer you a great deal on our latest product," extraction module 106 may extract a triple including the text "David" as the subject, "from" as the action or predicate, and "National Telecom" as the object. In some embodiments, the natural language processing utilized by extraction module 106 may include textual entailment (TE) recognition which generally refers a directional relation between text fragments. For example, in TE recognition, a relation may hold whenever the truth of one text fragment follows from another text fragment. In a TE framework, the entailing and entailed text fragments may be termed text (T) and hypothesis (H), respectively. Thus, in the text fragment "due to recent climate change legislation, you are required to upgrade your home insulation by 2021," the hypothesis (H) may be "you are required to upgrade your home insulation by 2021." In this example, as a person is listening to the text fragment "due to recent climate change legislation . . . ," this would infer that H is most likely true.

At step 306 one or more of the systems described herein may generate one or more queries to verify the alleged facts in the communication. For example, query module 108 may, as part of computing device 202 in FIG. 2, generate verification queries 124 to verify statements/claims 212 corresponding to alleged facts 122.

Query module 106 may generate verification queries 124 in a variety of ways. In some embodiments, query module 106 may generate questions based on natural language processing results (e.g., semantic triples) from statements/claims 212 made in communication 114. For example, query module 106 may generate the following question in response to the semantic triple "David, from, National Telecom:" "Do you currently have a field agent named David in {city, state}?" In this example, the values for {city, state} (e.g., the name information) may be obtained via a user's mobile computing device (e.g., computing device 202). As another example, query module 106 may generate the following question in response to the semantic triple "XPTO company, sells, solar panels:" "Does company XPTO exist and does it sell solar panels."

At step 308 one or more of the systems described herein may determine, utilizing distributed fact checking, whether the alleged facts are true based on the queries. For example, determining module 110, may, as part of computing device 202 in FIG. 2, determine, utilizing distributed fact checking, whether alleged facts 122 (including statements/claims 212) are true based on verification queries 124.

The term "distributed fact checking," as used herein, generally refers to a method of checking multiple resources (e.g., a data source that compiles information from multiple resources) for the authenticity of information (e.g., statements and/or claims) in received text in order to determine their veracity. Resources that may be utilized by distributed fact checking methods may include, without limitation, social media platforms having a large group of contributing users, collaborative online encyclopedias, online public databases, human (e.g., parent/guardian) sources, etc. In some examples, a distributed fact checking method may utilize a model based on a publicly available dataset for verification against textual sources. For example, in one embodiment, a distributed fact checking model may be trained on a collaborative data source, utilizing a publicly available dataset, to verify claims.

Determining module 110 may determine whether alleged facts 122 are true in a variety of ways. In some examples, determining module 112 may determine a verification method for performing distributed fact checking based on verification queries 124 and then perform, based on the determined verification method, distributed fact checking to verify whether one or more statements/claims 212 made in the alleged facts 122 are true. In some examples, the verification method may include manual, semi-automated, and/or automated methods. For example, a manual verification method may include sending statements/claims 212 to a trusted recipient (e.g., a parent, guardian, adult friend, or other trusted person) associated with trusted party computing device 218. As another example, a semi-automated verification method may include sending statements/claims 212 to a targeted trusted source, such as a bot-monitored online social media account. As yet another example, an automated verification method may include sending statements/claims 212 to a generic trusted source (e.g., a claim verification model built on a collaborative data source).

At step 310 one or more of the systems described herein may perform a security action that generates an alert to protect against a potential social engineering attack on the receiving party when at least one of the alleged facts are determined to be false. For example, security module 112, may, as part of computing device 202 in FIG. 2, perform a security action that generates an alert 126 to protect against a potential social engineering attack on the receiving party when one or more alleged facts 122 (including statements/claims 212) are determined to be false by determining module 110. In some embodiments, alerts 126 may include haptic feedback alert 216 generated for the receiving party on computing device 202. For example, security module 112 may generate haptic feedback alert 216 to notify the recipient party that a statement/claim 212 made in communication 114 has been verified, utilizing distributed fact checking, as being false (e.g., the National Telecom company does not have a field agent named David in the city/state of the receiving party). Alternatively, security module 112 may generate haptic feedback alert 216 to notify the recipient party that a statement/claim 212 made in communication 114 has been verified, utilizing distributed fact checking, as being true (e.g., the company XPTO exists and it does it sell solar panels).

Figure 5:
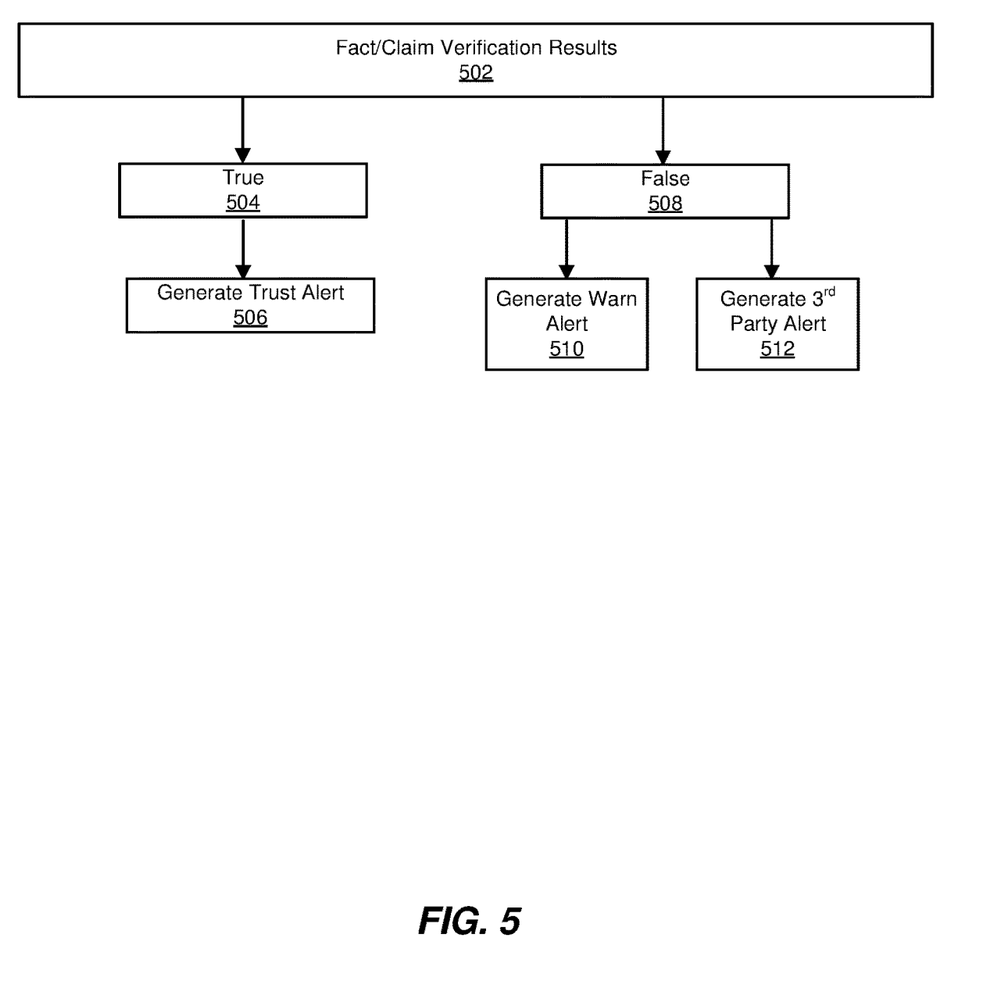
FIG. 5 is a block diagram of an example method for generating alerts based on fact/claim verification results obtained using distributed fact checking for preventing social engineering attacks.

Security module 112 may generate an alert 126 to protect against a potential social engineering attack in a variety of ways. For example, as shown in FIG. 5, security module 112, upon receiving fact/claim verification results 502 (i.e., from determining module 110) indicating that a statement/claim 212 has been determined to be false 508, may generate a warn alert 510 (e.g., a haptic feedback alert) for computing device 202 associated with the receiving party and, additionally or alternatively, generate a third party alert 512 (e.g., a telephone, text, or e-mail message) for sending to trusted party computing device 218 associated with a trusted party of the recipient party (e.g., a parent, guardian, adult friend, etc.).

In some examples, security module 112, upon receiving fact/claim verification results 502 (i.e., from determining module 110) indicating that a statement/claim 212 has been determined to be true 504, may generate a trust alert 506 (e.g., a haptic feedback alert) for computing device 202 associated with the receiving party. In some examples, generated warn alert 510 and generated trust alert 506 may be distinguishable haptic feedback alerts so that the recipient party may be able to verify the veracity of a statement/claim 212 without viewing computing device 202. For example, generated warn alert 510 may be a fast vibrating or strong force alert on computing device 202 while generated trust alert 506 may be a slow vibrating or weak force feedback alert on computing device 202.

Turning now to FIG. 4, an additional system 400 for preventing social engineering attacks using distributed fact checking will now be described. As illustrated in FIG. 4, example system 400 may include a communication 402 that is received by a word/tone detector 404. Example system 400 may also include automatic speech recognition module 406 that recognizes speech from word/tone detector 404 and generates a transcript 408. Example system 400 may also include acoustic feature extractor 410 for extracting acoustic features from communication 402 and for sending the extracted speech features to tone/pitch analysis and classification module 420.

Example system 400 may further include a statement/claim extractor module 412. Statement/claim extractor module 412 may include a named-entity extractor module 414 and a part-of-speech tagger/parser module 416. In some embodiments, named-entity extractor module 414 may extract a named entity (e.g., ACME, Inc.) from transcript 408 and part-of-speech tagger/parser 416 may tag and parse semantic triples from transcript 408. Additionally or alternatively, statement/claim extractor module 412 may also identify a representation 418 corresponding to a representation of fact (e.g., Dave is a representative for ACME, Inc.) in transcript 408. In some embodiments, the output of statement/claim extractor module 412 may be sent to sentiment analysis module 422 for the automatic detection of affective states embedded in text contained in the output of statement/claim extractor module 412. Additionally, the output of statement/claim extractor module 412 may also be sent to distributed fact checking module 426.

Example system 400 may further include a coercion/persuasion/threat detection module 424. In some embodiments, coercion/persuasion/threat detection module 424 may receive the output of sentiment analysis module 422 and tone/pitch analysis and classification module 420 to detect whether communication 402 (e.g., the conversation) includes any one of coercion, persuasion, or a threat made to a receiving party which may be one a number of factors in identifying a social engineering attack. For example, coercion/persuasion/thread detection module 424 may detect that communication 402 includes coercion based on a conversation where an individual is verbally intimidated into executing a money transfer while approaching an automatic teller machine (ATM). As another example, coercion/persuasion/threat detection module 424 may detect that communication 402 includes persuasion based on a conversation where a stranger approaches a child offering ice-cream and the stranger claims to be a colleague of the child's parent. The output of coercion/persuasion/threat detection module 424 may then be sent to distributed fact checking module 426.

In some embodiments, distributed fact checking module 426 may receive the outputs of both statement/claim extractor module 412 and coercion/persuasion/threat detection module 424. In some examples, distributed fact checking module 426 may include a verification query generation module 428 that generates fact/claim verification questions for fact verification module 430. In some examples, fact verification module 430 may verify facts/claims from communication 402 using any one of the following verification methods discussed above in the description of step 308 of FIG. 3 (e.g., manual, semi-automated, and automated verification methods). The output of distributed fact checking module 426 (i.e., the verification of whether facts/claims made in communication 402 are true or false) may then be sent to mitigation policy engine 432 for the generation of alerts (e.g., trust or warning alerts) to the receiving party of communication 402 and/or a trusted party associated with the receiving party.

As explained above in connection with method 300 above, the systems and methods described herein may utilize the output of a conversation recorded by a physical device (e.g., a mobile device with audio/video recording capabilities such as a smartphone, smartwatch or other wearable computing device) in a physical environment to extract alleged facts from a speaker's transcribed speech and perform distributed fact checking against either online data sources or other knowledge sources (e.g., a designated guardian) for validation of any claims made during the conversation based on the alleged facts. By performing distributed fact checking in this way, the systems and methods described herein may be utilized to identify potential social engineering attacks (including situations of physical harassment, scam and persuasion) and further enable discreet security intervention actions to be taken by a computing device according to a predefined notification policy (e.g., generating haptic feedback alerts, sending an electronic notification to a guardian, etc.) upon the validation of claims made by a party to the conversation to a potential victim. In this way, potential victims (e.g., vulnerable members of the population such as children, the elderly, etc.) and/or their designated guardians may become aware of potential social engineering attacks in real-time without alerting the alleged attacker in a physical environment.

Figure 6:
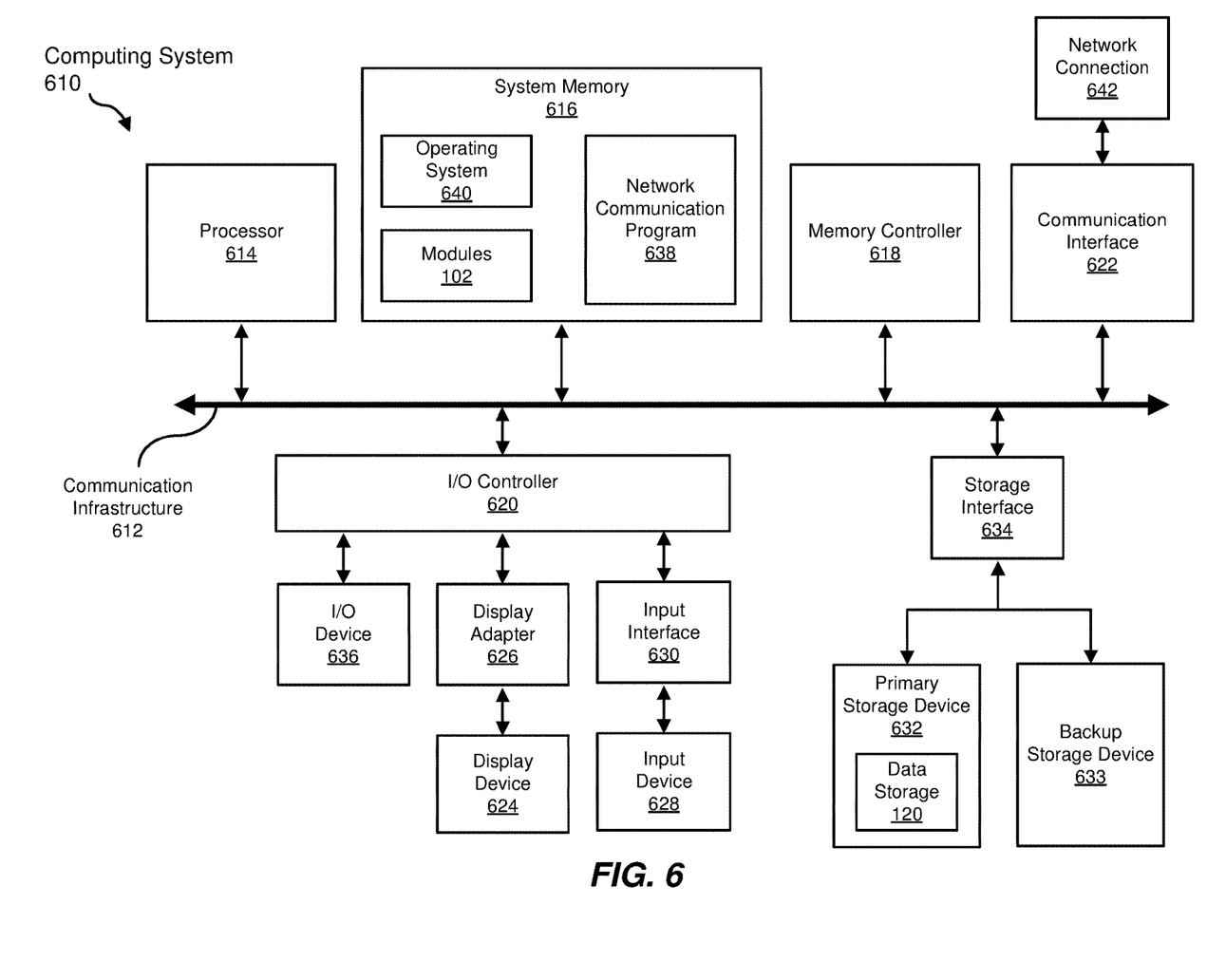
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitorytype media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
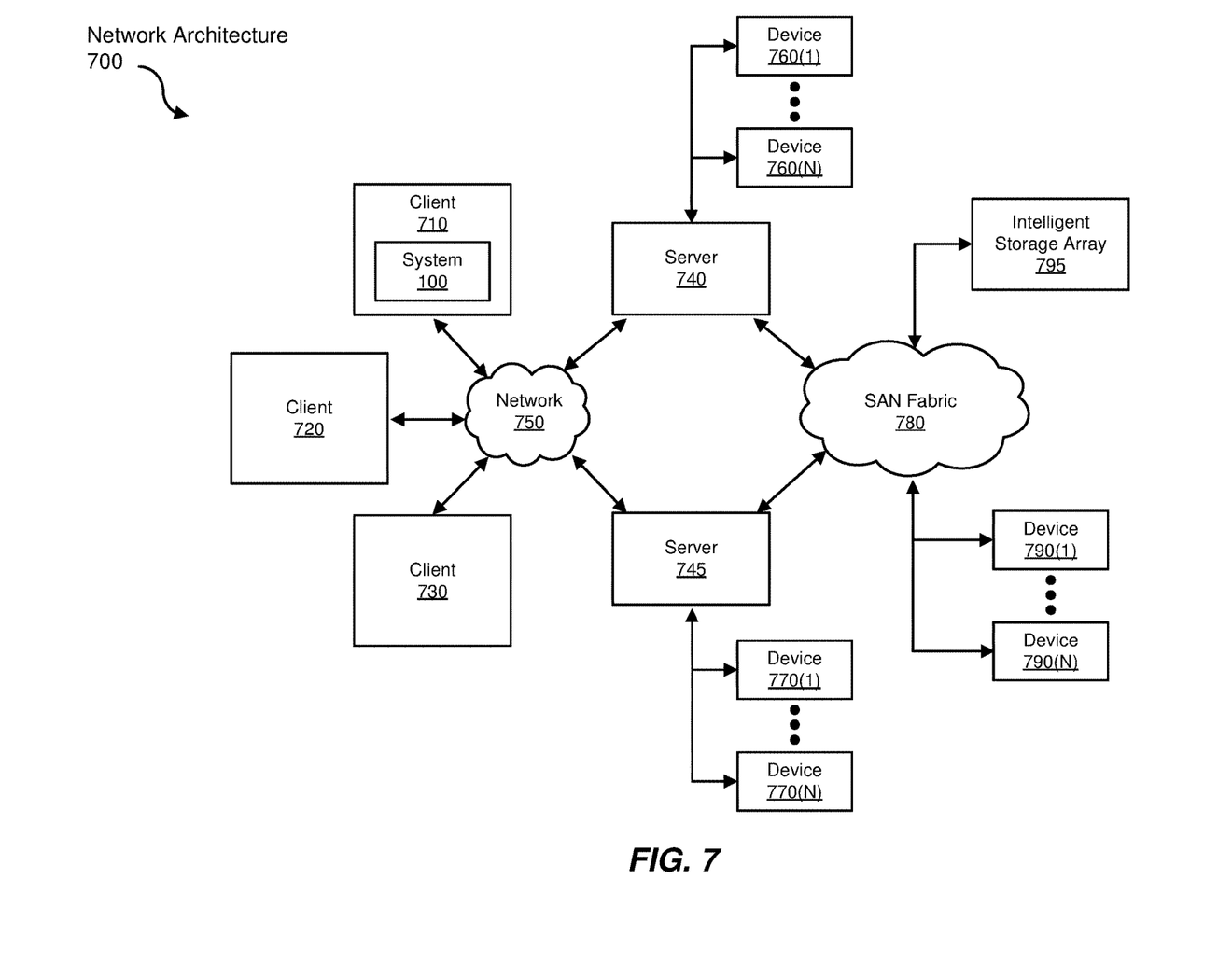
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for preventing social engineering attacks using distributed fact checking.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for preventing social engineering attacks using distributed fact checking, at least a portion of the method being performed by one or more computing devices comprising at least one processor, the method comprising:
    capturing, by the one or more computing devices, one or more words or tones received by a receiving party to a communication;
    extracting, by the one or more computing devices, speech features associated with the one or more words or tones to identify one or more alleged facts in the communication;
    generating, by the one or more computing devices, one or more queries to verify the one or more alleged facts in the communication, wherein generating the one or more queries comprises:
        receiving a semantic triple from natural language processing performed on the one or more alleged facts in the communication, the semantic triple representing only text corresponding to a subject, an object, and an action from at least one of a statement and a claim made to the receiving party in the communication;
        generating, in response to the semantic triple and based on results of the natural language processing, a partial question comprising a validation data field for receiving additional information to complete the partial question and to verify at least one of the subject and the object in the semantic triple that is associated with the one or more alleged facts, wherein the additional information for the validation data field comprises identification data, retrieved from the one or more computing devices, for verifying an alleged identity of the subject in the semantic triple associated with the one or more alleged facts; and
        retrieving the identification data for the validation data field to complete the partial question as the one or more queries, wherein the identification data is utilized to verify the alleged identity of the subject;
    determining, by the one or more computing devices and utilizing the distributed fact checking, whether the one or more alleged facts are true based on the one or more queries; and
    performing, by the one or more computing devices, a security action that generates an alert to protect against a potential social engineering attack on the receiving party when at least one of the one or more alleged facts are determined to be false.

2. The computer-implemented method of claim 1, further comprising performing, by the one or more computing devices, the security action that generates an alert by notifying the receiving party that the one or more alleged facts are true.

3. The computer-implemented method of claim 1, wherein capturing the words or tones received by the receiving party to the communication comprises:
    detecting, in real-time, a starting word or tone spoken at an initiation of the communication;
    recording, in response to the detected starting word or tone, the communication including each of the words or tones received by the receiving party; and
    transcribing the communication including each of the words received by the receiving party.

4. The computer-implemented method of claim 1, wherein extracting the speech features associated with the words or tones in the communication comprises:
    utilizing the natural language processing to recognize text fragments representing one or more statements made in a transcription of the communication; and
    extracting the text fragments from the transcription.

5. The computer-implemented method of claim 4, wherein the text fragments comprise the semantic triple.

6. The computer-implemented method of claim 4, wherein the natural language processing comprises textual entailment recognition.

7. The computer-implemented method of claim 1, wherein determining whether the one or more alleged facts are true comprises:
    determining a verification method for performing the distributed fact checking based on the one or more queries; and
    performing, based on the determined verification method, the distributed fact checking to verify whether one or more claims made in the one or more alleged facts are true.

8. The computer-implemented method of claim 7, wherein determining the verification method for performing the distributed fact checking based on the one or more queries comprises selecting at least one of:
    a trusted recipient associated with the receiving party for verifying the one or more claims made in the one or more alleged facts;
    a targeted trusted online source for verifying the one or more claims made in the one or more alleged facts; or
    a generic trusted online source for verifying the one or more claims made in the one or more alleged facts.

9. The computer-implemented method of claim 1, wherein the alert to protect against the potential social engineering attack on the receiving party comprises:
    a warning alert directed to the receiving party when the at least one of the one or more alleged facts are determined to be false; and
    a copy of the warning alert directed to a third party having a relationship with the receiving party when the at least one of the one or more alleged facts are determined to be false.

10. The computer-implemented method of claim 1, wherein the alert to protect against the potential social engineering attack on the receiving party comprises a trust alert directed to the receiving party when the at least one of the one or more alleged facts are determined to be true.

11. The computer-implemented method of claim 1, wherein the alert comprises a haptic feedback alert.

12. A system for preventing social engineering attacks using distributed fact checking, the system comprising:
    at least one physical processor;
    physical memory comprising computer-executable instructions and one or more modules that, when executed by the physical processor, cause the physical processor to:
        capture, by a capture module, one or more words or tones received by a receiving party to a communication;
        extract, by an extraction module, speech features associated with the words or tones to identify one or more alleged facts in the communication;

generate, by a query module, one or more queries to verify the one or more alleged facts in the communication, wherein the query module generates the one or more queries by:

receiving a semantic triple from natural language processing performed on the one or more alleged facts in the communication, the semantic triple representing only text corresponding to a subject, an object, and an action from at least one of a statement and a claim made to the receiving party in the communication;

generating, in response to the semantic triple and based on results of the natural language processing, a partial question comprising a validation data field for receiving additional information to complete the partial question and to verify at least one of the subject and the object in the semantic triple that is associated with the one or more alleged facts, wherein the additional information for the validation data field comprises identification data, retrieved from one or more computing devices, for verifying an alleged identity of the subject in the semantic triple associated with the one or more alleged facts; and retrieving the identification data for the validation data field to complete the partial question as the one or more queries, wherein the identification data is utilized to verify the alleged identity of the subject;

determine, by a determining module and utilizing the distributed fact checking, whether the alleged facts are true based on the one or more queries; and perform, by a security module, a security action that generates an alert to protect against a potential social engineering attack on the receiving party when at least one of the one or more alleged facts are determined to be false.

13. The system of claim 12, wherein the security module further performs the security action that generates an alert by notifying the receiving party that the one or more alleged facts are true.

14. The system of claim 12, wherein the capture module captures the words or tones received by the receiving party to the communication by:
detecting, in real-time, a starting word or tone spoken at an initiation of the communication;
recording, in response to detecting the starting word or tone, the communication including each of the words or tones received by the receiving party; and
transcribing the communication including each of the words received by the receiving party.

15. The system of claim 12, wherein the extraction module extracts the speech features associated with the words or tones in the communication by:
utilizing the natural language processing to recognize text fragments representing one or more statements made in a transcription of the communication; and
extracting the text fragments from the transcription.

16. The system of claim 15, wherein the text fragments comprise the semantic triple.

17. The system of claim 15, wherein the natural language processing comprises textual entailment recognition.

18. The system of claim 12, wherein the determining module determines whether the one or more alleged facts are true by:
determining a verification method for performing the distributed fact checking based on the one or more queries; and
performing, based on the determined verification method, the distributed fact checking to verify whether one or more claims made in the one or more alleged facts are true.

19. The system of claim 18, wherein the determining module determines the verification method for performing the distributed fact checking based on the one or more queries by selecting at least one of:
a trusted recipient associated with the receiving party for verifying the one or more claims made in the one or more alleged facts;
a targeted trusted online source for verifying the one or more claims made in the one or more alleged facts; or
a generic trusted online source for verifying the one or more claims made in the one or more alleged facts.

20. A non-transitory computer-readable medium comprising one or more computer-executable instructions that, when executed by at least one processor of a computing device, cause the computing device to:
capture one or more words or tones received by a receiving party to a communication;
extract speech features associated with the words or tones to identify one or more alleged facts in the communication;
generate one or more queries to verify the one or more alleged facts in the communication, wherein the one or more queries are generated by:
receiving a semantic triple from natural language processing performed on the one or more alleged facts in the communication, the semantic triple representing only text corresponding to a subject, an object, and an action from at least one of a statement and a claim made to the receiving party in the communication;
generating, in response to the semantic triple and based on results of the natural language processing, a partial question comprising a validation data field for receiving additional information to complete the partial question and to verify at least one of the subject and the object in the semantic triple that is associated with the one or more alleged facts, wherein the additional information for the validation data field comprises identification data, retrieved from the computing device, for verifying an alleged identity of the subject in the semantic triple associated with the one or more alleged facts; and
retrieving the identification data for the validation data field to complete the partial question as the one or more queries, wherein the identification data is utilized to verify the alleged identity of the subject;
determine, utilizing the distributed fact checking, whether the one or more alleged facts are true based on the one or more queries; and
perform a security action that generates an alert to protect against a potential social engineering attack on the receiving party when at least one of the one or more alleged facts are determined to be false.

* * * * *